United States Patent
Garcia-Tobin et al.

(10) Patent No.: US 11,409,349 B2
(45) Date of Patent: Aug. 9, 2022

(54) POWER MANAGEMENT

(71) Applicant: Arm Limited, Cambridge (GB)

(72) Inventors: Carlos Garcia-Tobin, Ely (GB); Jose Manuel Silva Dos Santos Marinho, Cambridge (GB); Ashley John Crawford, Ashdon (GB); Anouk Martha H Van Laer, Cambridge (GB)

(73) Assignee: Arm Limited, Cambridge (GB)

( * ) Notice: Subject to any disclaimer, the term of this patent is extended or adjusted under 35 U.S.C. 154(b) by 166 days.

(21) Appl. No.: 16/420,578

(22) Filed: May 23, 2019

(65) Prior Publication Data

US 2020/0371575 A1 Nov. 26, 2020

(51) Int. Cl.
*G06F 1/32* (2019.01)
*G06F 1/3206* (2019.01)
*G06F 9/38* (2018.01)
*G06F 1/324* (2019.01)

(52) U.S. Cl.
CPC .......... *G06F 1/3206* (2013.01); *G06F 1/324* (2013.01); *G06F 9/3836* (2013.01)

(58) Field of Classification Search
CPC ..... G06F 1/32; G06F 1/34; G06F 1/26; G06F 9/44
See application file for complete search history.

(56) References Cited

U.S. PATENT DOCUMENTS

| | | | |
|---|---|---|---|
| 9,838,025 B1 | 12/2017 | Deng | |
| 2005/0223251 A1 | 10/2005 | Liepe | |
| 2012/0120860 A1* | 5/2012 | Chui | H04W 52/0229 370/311 |
| 2014/0157277 A1 | 6/2014 | Eisen | |
| 2015/0033045 A1 | 1/2015 | Raghuvanshi | |
| 2015/0074431 A1* | 3/2015 | Nguyen | H02J 3/0073 713/300 |
| 2015/0378412 A1* | 12/2015 | Suryanarayanan | G06F 9/3824 713/340 |
| 2016/0381621 A1* | 12/2016 | Kim | H04L 67/303 370/329 |
| 2017/0063125 A1* | 3/2017 | Jezierski, Jr. | H02J 3/32 |
| 2017/0192476 A1* | 7/2017 | Shaw | G06F 13/4022 |
| 2018/0027045 A1* | 1/2018 | Rodrigues | H04L 67/18 709/203 |
| 2020/0310509 A1* | 10/2020 | Gendler | G06F 1/3296 |

OTHER PUBLICATIONS

Office Action dated Sep. 14, 2021 for U.S. Appl. No. 17/126,849, 15 pages.

* cited by examiner

*Primary Examiner* — Keshab R Pandey
(74) *Attorney, Agent, or Firm* — Nixon & Vanderhye P.C.

(57) ABSTRACT

A data processing apparatus includes processing circuitry to process an event stream that includes one or more high power events. Tracking circuitry tracks the one or more high power events and power management circuitry manages power consumption by controlling a voltage supply and a frequency of a clock signal provided to the processing circuitry. The power management circuitry controls an extent to which execution by the processing circuitry of the high power events is restricted.

17 Claims, 6 Drawing Sheets

| TC IN MICRO INTERVAL | V(v) | F (GHz) |
|---|---|---|
| 60% | 1 | 2.8 |
| 20% | 0.9 | 2.4 |
| 0% | 0.8 | 2.0 |

FIG. 2

POWER MANAGEMENT

TECHNICAL FIELD

The present disclosure relates to power management. For instance, the present techniques could be used in relation to power management of a data processing apparatus.

DESCRIPTION

In a data processing apparatus, it is typically necessary to provide a power supply that can provide sufficient power to the data processing apparatus for it to operate in a worst-case scenario (e.g. under its highest loading). As the performance of processors has increased, the difference between the highest and lowest loading, or between the highest and average loading, has increased. This in turn causes more powerful power supplies to be provided, which increase the cost and the size of the data processing apparatus. Power supply can be limited through voltage and frequency scaling. However, this can have an impact on the overall throughput of the data processing apparatus, since instructions may be slowed down by such a technique. It would therefore be desirable to limit or reduce the power consumption of a data processing apparatus without necessarily having to reduce the voltage and/or frequency as much.

SUMMARY

Viewed from a first example configuration, there is provided a data processing apparatus comprising: processing circuitry to process an event stream comprising one or more high power events; tracking circuitry to track the one or more high power events; and power management circuitry to manage power consumption by controlling a voltage supply and a frequency of a clock signal provided to the processing circuitry, wherein the power management circuitry controls an extent to which execution by the processing circuitry of the high power events is restricted.

Viewed from a second example configuration, there is provided a data processing method comprising: processing an event stream comprising one or more high power events; tracking the one or more high power events; and performing power consumption management by controlling a voltage supply and a frequency of a clock signal, wherein the power consumption management also comprises controlling an extent to which execution by the processing circuitry of the high power events is restricted.

Viewed from a third example configuration, there is provided a data processing apparatus comprising: means for processing an event stream comprising one or more high power events; means for tracking the one or more high power events; and means for managing power consumption by controlling a voltage supply and a frequency of a clock signal provided to the means for processing, wherein the means for managing power consumption is adapted to control an extent to which execution of the high power events by the means for processing is restricted.

BRIEF DESCRIPTION OF THE DRAWINGS

The present invention will be described further, by way of example only, with reference to embodiments thereof as illustrated in the accompanying drawings, in which:

FIG. 2 illustrates example power configurations that may be applied to the data processing apparatus in accordance with some embodiments;

DESCRIPTION OF EXAMPLE EMBODIMENTS

Figure 1:
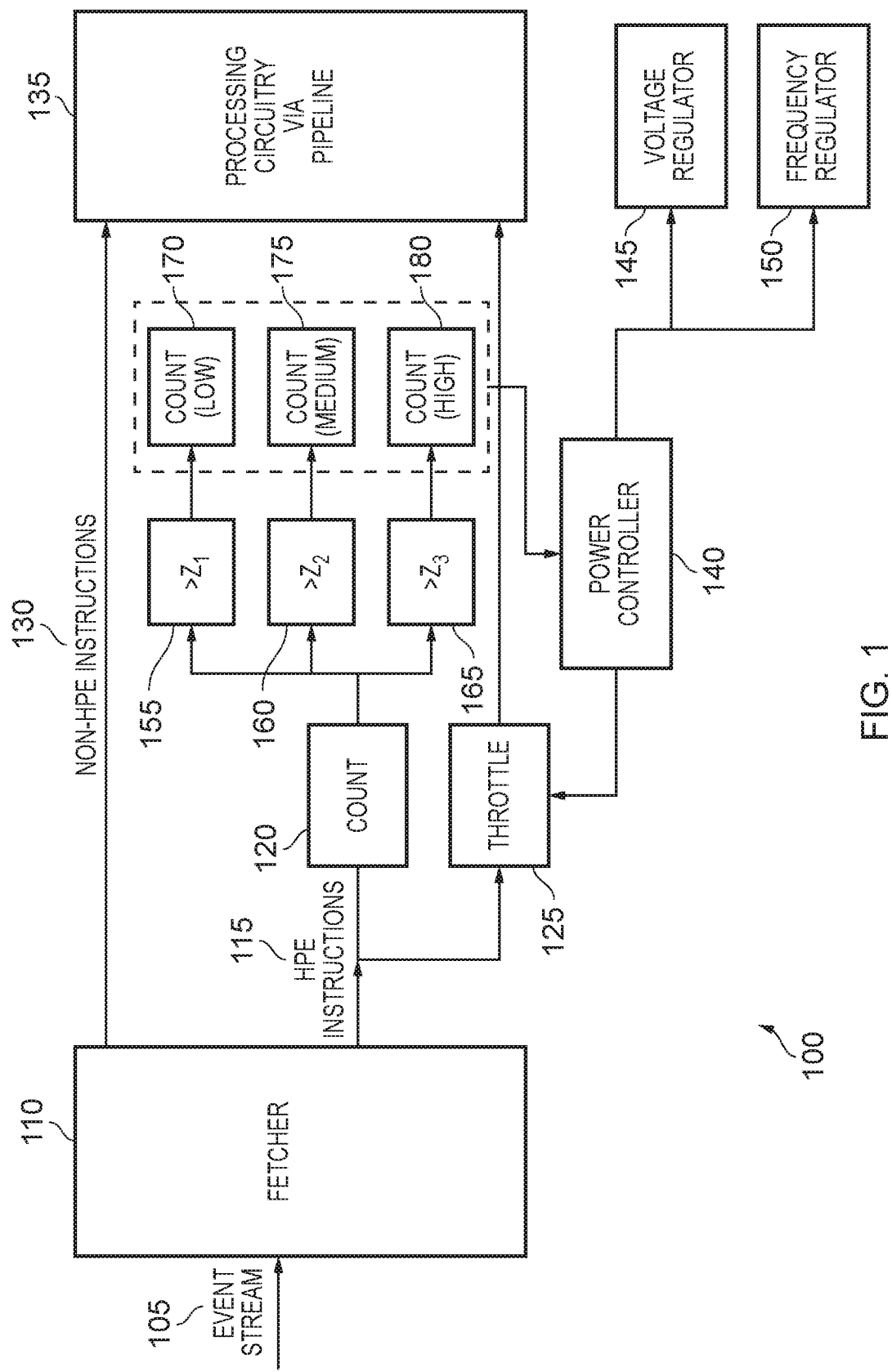
FIG. 1 schematically illustrates a data processing apparatus in accordance with some embodiments.

Before discussing the embodiments with reference to the accompanying figures, the following description of embodiments is provided.

In accordance with some embodiments there is provided a data processing apparatus comprising: processing circuitry to process an event stream comprising one or more high power events; tracking circuitry to track the one or more high power events; and power management circuitry to manage power consumption by controlling a voltage supply and a frequency of a clock signal provided to the processing circuitry, wherein the power management circuitry controls an extent to which execution by the processing circuitry of the high power events is restricted.

High Power Events (HPEs) use large amounts of energy. For instance, HPEs may consume more energy in comparison to other events. Sometimes, this larger amount of energy that is used is as a consequence of a larger portion of the data processing apparatus becoming active, as compared to an event that is a non-HPE. One way of reducing power consumption in a data processing apparatus is therefore to control or limit the extent to which such HPEs can be executed by the processing circuitry. For instance, if only a limited number of HPEs can be executed in a period of time, or if HPEs are distributed across a number of processor cycles then the energy consumption over time (e.g. power consumption) is reduced. Furthermore, since this technique has little or no effect on non-HPEs, the ability of the data processing apparatus to execute instructions generally remains the same. That is, the peak power consumption of the data processing apparatus can be limited without necessarily resorting to reductions in voltage and/or frequency.

In some embodiments, the event stream comprises one or more instructions; and the one or more high power events comprise one or more high power instructions. The HPEs could therefore be caused by particular instructions being executed by the processing circuitry. Another example of HPEs could include data cache activity such as hardware prefetches.

In some embodiments, the one or more high power events consume more power than an average power consumption of other events in the event stream. There are a number of ways of defining HPEs. However, in these embodiments, HPEs are defined as being those events that consume more energy than an average power consumption of all events. In some embodiments, rather than comparing to an average, the HPEs may include, from among all events processed by a processing circuit, the top x % of energy consuming events. In some other embodiments, HPEs are defined as being events that are greater (by some margin such as 25% or 50% or 100%) than the average power consumption of all events.

In some embodiments, the one or more high power events comprise a subset of instruction types. Such instruction types could be selected by an architect of the data processing apparatus to encompass particular categories of instruction that are known to be heavy energy consumers as compared to other types of instruction. For example, in some embodiments, the subset of instruction types comprises vector instructions. Vector instructions are instructions in which a single operation is performed on a large number of data values simultaneously. This can be achieved by providing a plurality of processing circuits and by passing each data value to its own processing circuit, with the same instruction (or control signal) being passed to each processing circuit to perform the same operation on each of the data values. This is referred to as Single Instruction Multiple Data (SIMD) parallelism. Due to the large number of processing circuits, which operate in parallel, the energy consumed in executing such instructions is often significantly higher than for non-vector (scalar) instructions in which perhaps only a single one of the processing circuits is active. Furthermore, the energy can be consumed in a short period of time, leading to high power consumption. One example of a Vector Instruction is a Scalable Vector Instruction, in which the number of data values provided by instructions can vary between instructions.

In some embodiments, the power consumption circuitry is adapted to keep power consumption of the data processing apparatus below a power limit by controlling the extent to which execution by the processing circuitry of the high power events is restricted. Consequently, by controlling the extent to which execution of the HPEs is restricted, it is possible to reduce the overall power consumption, e.g. to below a power limit that can be handled by the power management circuitry. This makes it possible for lower rated power supplies to be used with the data processing apparatus, which in turn means that lower-cost and smaller power supplies can be used.

In some embodiments, the power consumption circuitry is adapted to smooth peaks in power consumption of the data processing apparatus by controlling the extent to which execution by the processing circuitry of the high power events is restricted. Power consumption can be described as energy consumption over time. Consequently, by slowing down or limiting the execution of HPEs, the energy consumed will remain the same, but will be spread out over a longer period of time, thereby "smoothing" the power consumption and reducing spikes. This makes it possible to use lower rated power supplies for the data processing apparatus, which may only be able to provide lower amounts of power.

In some embodiments, the tracking circuitry is adapted to count the one or more high power events.

In some embodiments, the tracking circuitry is adapted to count, for each of a plurality of micro-intervals, a number of the one or more high power events processed by the processing circuitry; and the tracking circuitry is adapted to count, for a macro-interval comprising the plurality of micro-intervals, a number of the micro-intervals during which the number of the one or more high power events processed by the processing circuitry exceeds an occurrence threshold. A micro-interval may be considered to be a number of cycles of the processing circuitry. A macro-interval may be considered to be a number of cycles of the processing circuitry, which is bigger than for the micro-interval. However, note that there is no requirement for the macro-interval to be an exact multiple of the number of micro-intervals. In either case, an occurrence threshold is defined for the micro-intervals, and the tracking circuitry counts the number of HPEs that occur in each micro-interval. Then, for each macro-interval, the tracking circuitry counts the number of micro-intervals for which the number of HPEs exceeded the occurrence threshold. This can be used to provide a measure of the number of HPEs that are occurring and how the HPEs are clustered. Such information is useful to avoid thrashing, e.g. continually over-compensating for a situation arising, firstly by responding to a large number of HPEs, then responding to a small number of HPEs, etc.

In some embodiments, the power management circuitry defines a plurality of power configurations; each of the power configurations defines a value for each of the voltage supply, the frequency of the clock signal, and the extent to which execution by the processing circuitry of the high power events is restricted; and the processing circuitry is adapted to operate in a current power configuration in the plurality of power configurations. A power configuration dictates a voltage that is supplied to the processing circuitry and/or the data processing apparatus, a clock frequency under which the processing circuitry operates, and the extent to which the HPEs is restricted. The overall power consumption of the processing circuitry is a function of these three factors.

In some embodiments, across the plurality of power configurations, as at least one of the voltage supply and the frequency of the clock signal decreases, the extent to which execution by the processing circuitry of the high power events is restricted decreases. For example, as the voltage and frequency decrease between one power configuration and the next, the execution of HPEs is made more permissive. Restricting the execution of HPEs has a linear effect on power consumption. For instance, if HPEs are restricted to execute at half the rate of normal speed, then approximately half the power is consumed. However, adjusting the frequency and voltage has a non-linear (e.g. squared) relationship. For instance, if the voltage/frequency is lowered by a half then approximately a quarter of the power is consumed. Where there are many HPEs, reducing frequency/voltage will provide a better overall throughput since this allows for the HPE rate limitation to be reduced. If there are many HPEs, the overall throughput will therefore increase. In contrast, if there are not many HPEs, then restricting the execution of those HPEs will make it possible for frequency/voltage to remain higher for a given power limit.

In some embodiments, the tracking circuitry is adapted to count, for each of a plurality of micro-intervals, a number of the one or more high power events processed by the processing circuitry; the tracking circuitry is adapted to count, for a macro-interval comprising the plurality of micro-intervals, a number of the micro-intervals for which the number of the one or more high power events processed by the processing circuitry exceeds an occurrence threshold; and the tracking circuitry is adapted to count, for the macro-interval, the number of micro-intervals for which the number of the one or more high power events processed by the processing circuitry exceeds each of a plurality of occurrence thresholds. In such embodiments, a number of different thresholds are provided. In this way, it is possible to determine not only whether restriction of HPE execution should occur, but also the extent to which such restriction could (if operating at that other threshold) occur. In particular, if there are numerous micro-intervals in which the number of executed HPEs is very high (e.g. multiple thresholds are met) then a different course of action may be taken as compared to the situation where there are numerous micro-intervals in which the number of executed HPEs is low (e.g. only a small number or no thresholds are met).

In some embodiments, each of the occurrence thresholds is associated with one of the power configurations; the current power configuration is associated with a current occurrence threshold; and the power management circuitry is adapted, in response to the current occurrence threshold being exceeded at least an upper limit number of times, to select one of the power configurations in which the extent to which execution by the processing circuitry of the high power events is restricted to a lesser degree than the current power configuration as the current power configuration. Consequently, in such embodiments, a power configuration having less aggressive restrictions (e.g. one in which execution of the HPEs is restricted less) is selected as the current power configuration when the threshold associated with the current threshold is exceeded a certain number of times (the upper limit). Thus, if HPEs occur to a greater extent than "supported" by the current power configuration, then a power configuration that restricts execution of the HPEs less is selected to become the new, current, active power configuration. By limiting HPEs to a lesser extent, the HPEs can be permitted to progress more quickly (potentially lowering voltage and frequency to compensate) and therefore provide increased throughput.

In some embodiments, each of the occurrence thresholds is associated with one of the power configurations; the current power configuration is associated with a current occurrence threshold; and the power management circuitry is adapted, in response to there being a lower power configuration in which the extent to which execution by the processing circuitry of the high power events is restricted to a higher degree than the current power configurations whose associated threshold is exceeded by at most a lower limit number of times, to select the lower power configuration as the current power configuration. As opposed to the preceding paragraph, in such embodiments, if the number of HPEs being executed is less than is "supported" by a power configuration that performs more restriction of HPEs than the current configuration, then that power configuration is selected to become the current configuration. That is, if there is a power configuration that better supports the low number of HPEs, then that power configuration is selected in order to increase the restriction of HPEs (potentially allowing voltage and frequency to be increased).

In some embodiments, the power management circuitry causes the high power events to be restricted by throttling the rate at which the high power events are processed by the processing circuitry. Such throttling can occur in a number of ways. For instance, the HPEs could be "stretched" across a number of processor cycles so that although the energy consumption remains the same, the energy over time is reduced. The event stream could also be reordered so that, for instance, HPEs are not clustered together, which can result in a large "bubble" of high power consumption. The HPEs could also simply be stalled. Other techniques that are known to the skilled person could also be implemented. Furthermore, any of these techniques could be used in any combination.

In some embodiments, the tracking circuitry is adapted to count, for each of a plurality of micro-intervals, a number of the one or more high power events processed by the processing circuitry; and the extent to which the high power events are processed by the processing circuitry is a number of high power events executed by the processing circuitry for each of the micro-intervals. In this manner, the restriction on the execution of HPEs is defined at a micro-interval level of granularity. For instance, the restriction could define that only a certain number of HPEs can execute in a given micro-interval before throttling of HPEs occurs.

Particular embodiments will now be described with reference to the figures.

FIG. 1 schematically illustrates a data processing apparatus 100 in accordance with some embodiments. The data processing apparatus 100 receives an event stream 105 which could take the form of a stream of instructions. The stream of instructions is fetched from, for instance, an instruction cache or main memory by a fetcher 110. In this example, the fetcher 110 divides the instructions into two portions based on their type—HPE or non-HPE. There are a number of ways in which such categorisation can take place, but in these embodiments, vector instructions are considered to be HPEs while scalar instructions are considered to be non-HPEs.

The non-HPE instructions 130 are passed, via a pipeline, to a processing circuitry 135 where the instructions are executed.

The HPE instructions 115 are passed to both a throttle 125 and a counter 120. The throttle controls the rate at which HPE instructions 115 are passed on to the processing circuitry via the pipeline 135. This makes it possible to slow down the rate at which HPE instructions 115 are processed, or to extend their execution across a number of processor cycles. The counter 120 is an example of tracking circuitry, and counts the number of HPE instructions 115 that are received within a micro-interval (a plurality of ticks of a clock signal provided to the data processing apparatus 100). This updated count 120 is then compared via a number of comparators 155, 160, 165 to thresholds $Z_1$, $Z_2$, $Z_3$.

Each of the comparisons 155, 160, 165 compares the current count value 120 to one of the thresholds $Z_1$, $Z_2$, $Z_3$ and increases a corresponding counter value 170, 175, 180 if the comparison indicates that the current count is higher. The counters 170, 175, 180 are therefore indicative of the number of micro-intervals for which each of the thresholds $Z_1$, $Z_2$, $Z_3$ is exceeded in the current macro-interval.

Power control circuitry 140 compares each of the counters 170, 175, 180 and on the basis of these values, causes power management to occur. In particular, the power controller 140 is able to cause voltage change for the data processing apparatus via a voltage regulator 145 or to cause a change in the clock frequency via a frequency regulator 150. In addition, the power controller 140 is able to control the throttle 125 and thereby limit the extent to which HPE instructions 115 are executed.

In this way, based on the number of HPE instructions that are encountered, the power controller 140 is able to vary the voltage, frequency, and throttling of the HPE instructions in order to achieve an overall high throughput of instruction execution while limiting power consumption of the data processing apparatus 100.

In some other embodiments, rather than using entirely hardware comparisons, the counters can be read by a firmware element and the power management may be enacted by that element.

FIG. 2 illustrates a number of power configurations that can be selected by the power controller 140. Each of the power configurations includes a Throttle Control (TC), a voltage in volts and a frequency in gigahertz. These throttle controls indicate the extent to which throttling of HPE instructions occurs during a given micro-interval. A higher value indicates that a higher degree of throttling occurs. For instance, the first power configuration refers to a TC of 60 percent. This indicates that on average, the HPE throughput on the micro-interval is 60 percent lower than the throughput of the same instruction stream if no throttling took place. Within the same configuration, the voltage provided to the data processing apparatus 100 is 1V, and the frequency of the clock signal provided to the data processing apparatus is 2.8 GHz. In other words, a high level of throttling for HPE instructions occurs when a high voltage and frequency are provided. The high level of throttling applied to HPE instructions makes it possible to operate at a high frequency and voltage for the same power 'budget'. Such a technique is appropriate when the number of HPE instructions is low, so that applying throttling will have a limited effect on the overall throughput.

At the other end of the spectrum, a third power configuration provides no throttling (0%) of HPE instructions. In the same configuration, a voltage of 0.8V and a clock frequency of 2 GHz are provided. Consequently, when the throttling of HPE instructions is low, the voltage and the frequency that are supplied to the data processing apparatus 100 are also low. HPE instructions are permitted to execute quickly, but doing so requires that voltage and frequency are lowered. Such a technique is appropriate when the number of HPE instructions is high, so that a large number of instructions are not throttled.

The overall power consumption by the data processing apparatus 100 is a function of each of the TC, voltage, and frequency. In particular, as a voltage and frequency drop, there is a non-linear decrease in power consumption (a squared relationship). For instance, when the voltage drops in half, the power consumption drops by approximately a quarter. There is, however, a linear relationship in the power consumption and the throttle control.

Note that the extent to which throttling is applied can vary between embodiments. Furthermore, the throttling can be achieved in a number of different ways as previously discussed.

Figure 3:
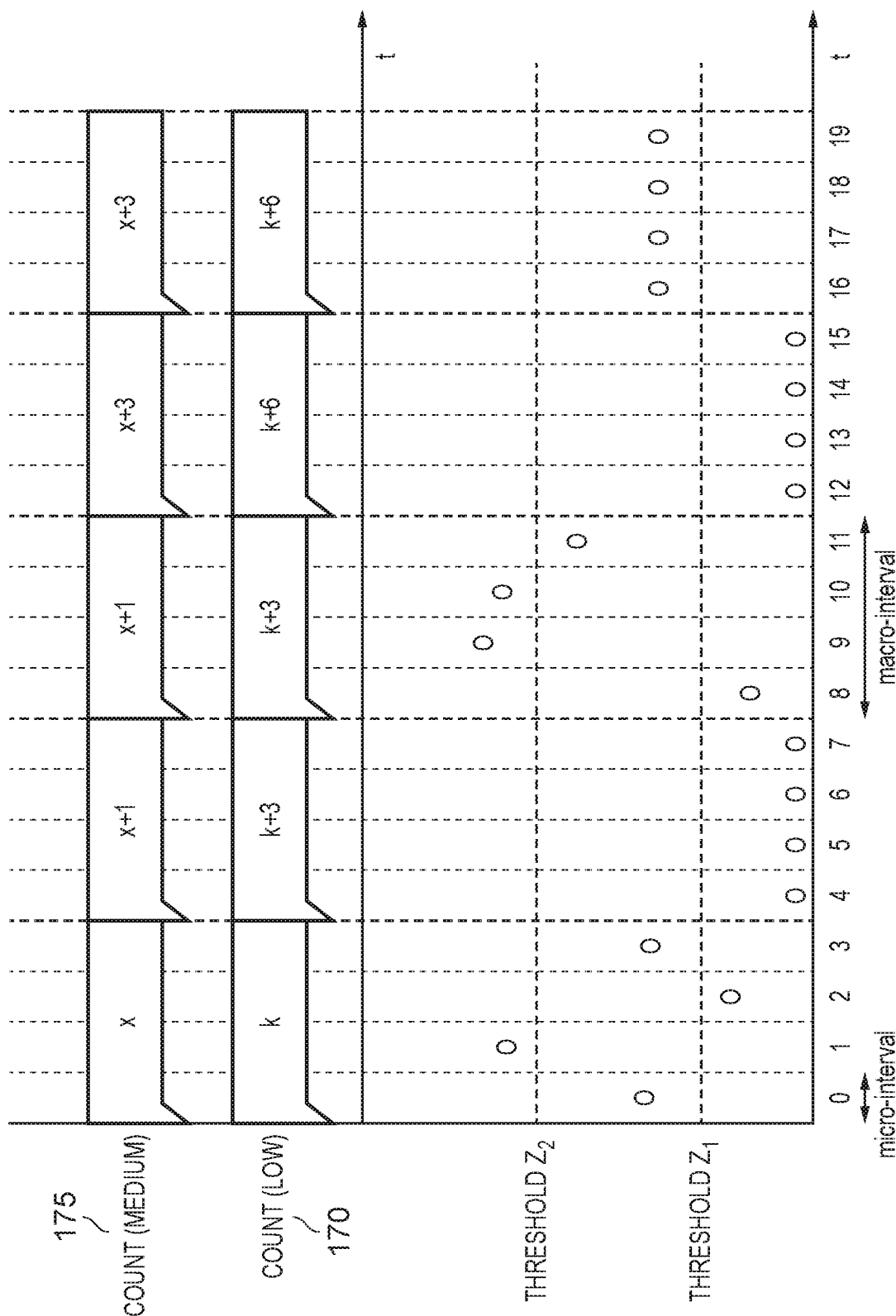
FIG. 3 shows the relationship between micro-intervals and macro-intervals for the purposes of counting high power events, in accordance with some embodiments.

FIG. 3 illustrates the relationship between micro-intervals and macro-intervals. In this example, the number of micro-intervals in which the $Z_1$ threshold is stored by a first low counter 170, and the number of micro-intervals for which the $Z_2$ threshold is met is counted by a medium counter 175. The initial value of the low counter 170 is k, while the initial value of the medium counter 175 is x. In this example, each macro-interval is made up of four micro-intervals. From a review of FIG. 3, it will be noted that during the first macro-interval, there are three micro-intervals in which the number of HPE instructions exceeds $Z_1$. These micro-intervals are numbered as 0, 1, and 3. Accordingly, at a next macro-interval, the value of the low counter 170 has increased from k to k+3. During the same first macro-interval, there is one micro-interval in which the number of HPE instructions exceeds $Z_2$. This is the micro-interval numbered as 1. Accordingly, at a next macro-interval, the value of the medium count 175 has increased from x to x+1. During the second macro-interval, there are no micro-intervals in which either $Z_1$ or the $Z_2$ are exceeded. Consequently, the values of the low count 170 and the medium count 175 in the following macro-interval remain as k+3 and x+1 respectively. During the third macro-interval, there are three micro-intervals, (9, 10, and 11) during which $Z_1$ is exceeded, and there are two micro-intervals (9 and 10) in which $Z_2$ is exceeded. Consequently, during the fourth macro-interval, the low counter 170 is increased from k+3 to k+6 and the medium counter 175 is increased from x+1 to x+3. During the fourth macro-interval, there are again no micro-intervals in which the number of HPE instructions exceeds $Z_1$ or $Z_2$, and consequently during the fifth macro-interval, the value of the low counter 170 and the medium counter 175 remain the same. During the fifth macro-interval, there are four micro-intervals (16, 17, 18 and 19), during which the number of HPEs exceeds $Z_1$. There are no micro-intervals in which $Z_2$ is exceeded. Consequently, although not shown in FIG. 3, the value of the low counter 170 for the following macro-interval would increase from k+6 to k+10. Meanwhile, the value of the medium counter 175 would remain at x+3.

Figure 4:
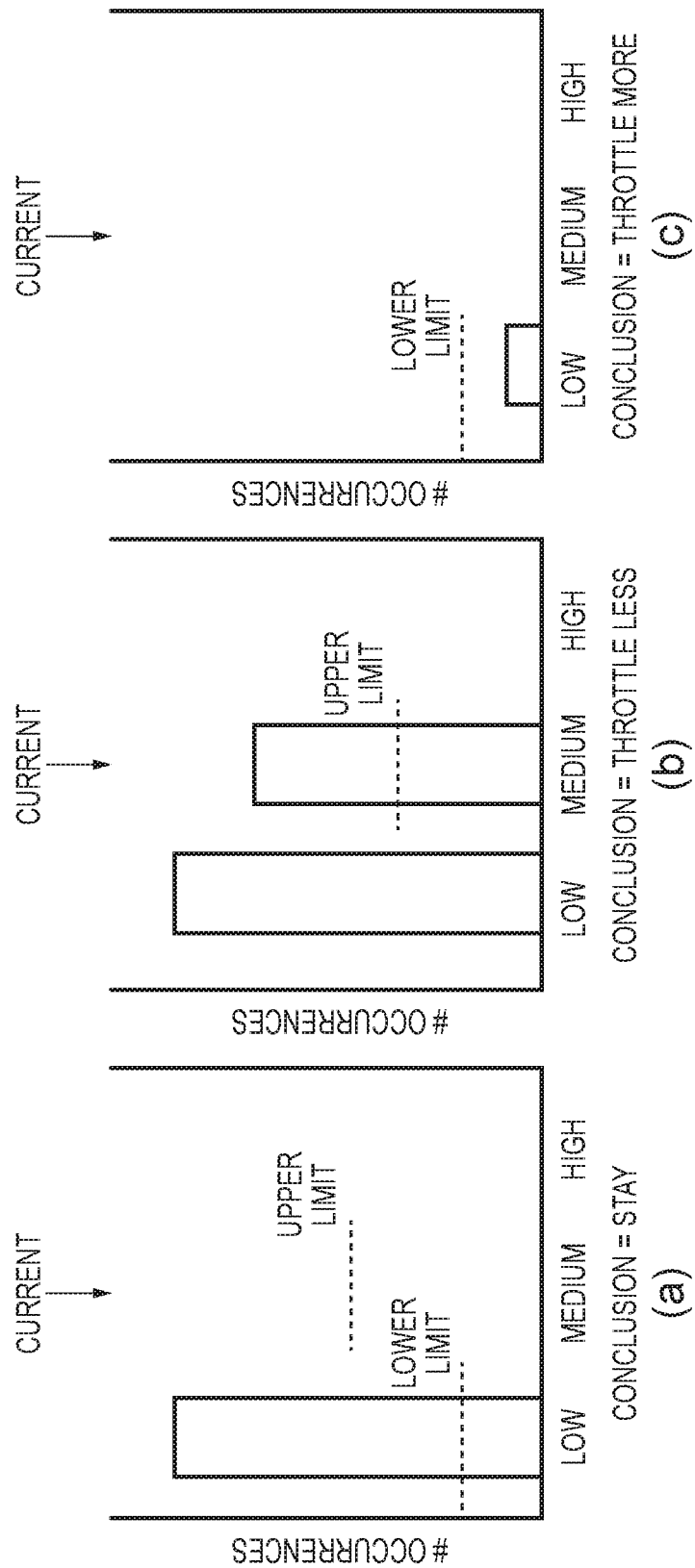
FIG. 4 illustrates a series of graphs in the form of FIGS. 4A, 4B, and 4C that illustrate the conditions under which different power configurations can be applied, in accordance with some embodiments.

FIG. 4 illustrates the relationship between power configurations and the micro-interval counts 170, 175, 180 during a macro-interval. In particular, FIG. 4 illustrates how a current power configuration is changed based on these counts 170, 175, 180. Each of the power configurations is associated with one of the counters 170, 175, 180.

FIG. 4A illustrates an example in which the current power configuration is associated with the $Z_2$ (medium threshold) count 175. In this example, the value of the $Z_1$ (low threshold) count 170 is high, while the value of the $Z_2$ count 175 and the $Z_3$ (high threshold) count 180 are both low. In other words, within the current macro-interval, there have been a large number of micro-intervals in which the number of HPE instructions has reached a first threshold, but not a second threshold higher than the first threshold, or a third threshold higher than the second threshold. In this example, the power configuration is deemed to be correct. This is because the number of micro-intervals for which the $Z_1$ threshold has been met is above a lower limit and the number of micro-intervals for which the $Z_2$ threshold has been met is below an upper limit. This indicates that the current throttling mechanism is preventing spikes in power consumption.

FIG. 4B illustrates a situation in which there are a large number of micro-intervals for which the $Z_1$ threshold has been met. In contrast to FIG. 4A, however, there are also a large number of micro-intervals within the macro-interval for which the $Z_2$ threshold has also been met. In particular, the number of such micro-intervals is above an upper limit. In this situation, it is determined that the throttling that is occurring is too aggressive. In particular, there are a large number of micro-intervals in which the number of HPE instructions exceeds not only first threshold but also a second threshold. Accordingly the conclusion is to reduce throttling so that the HPE instructions can be executed.

FIG. 4C illustrates the opposite situation. In particular, the power configuration that is currently in use is associated with the medium counter 175. However, in this example, not only are there zero micro-intervals not meeting the $Z_2$ threshold, but the number of micro-intervals having a number of HPE instructions below the $Z_1$ threshold is below a lower limit. This therefore indicates that the amount of throttling is not sufficiently aggressive. In particular, since there are a small number of HPEs occurring, the throttling can be increased so that, for instance, the voltage and frequency can be increased instead, thereby allowing other instructions to execute more quickly. That is, power consumption can be kept approximately the same and the power savings gained by increasing throttling of the HPE instructions can be used in order to increase voltage/frequency, therefore increasing the throughput of non-HPE instructions.

The upper limit and lower limit may be set for each of the different power configurations.

Figure 5:
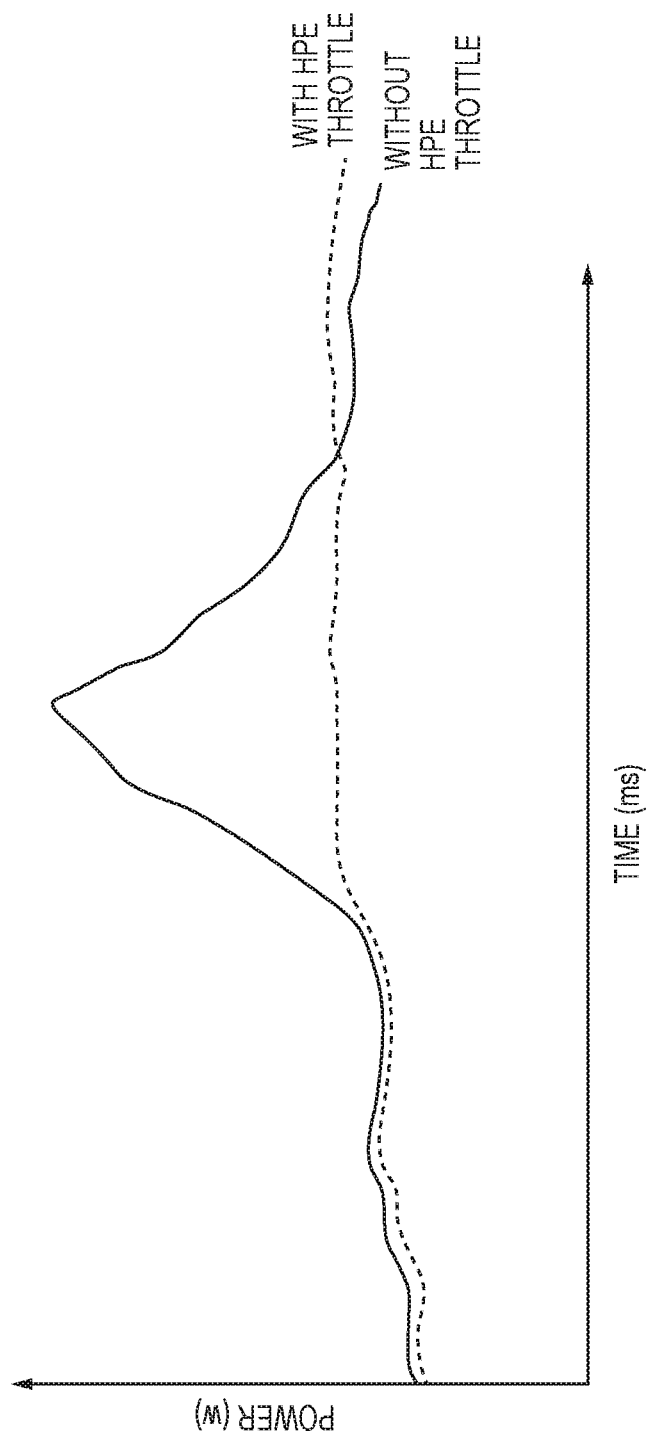
FIG. 5 shows the effect of throttling high power events in accordance with some embodiments.

FIG. 5 illustrates the behaviour of the throttling process. In particular, FIG. 5 illustrates the power consumption in watts over time in milliseconds. Without the HPE throttle, FIG. 5 illustrates that a spike in power consumption occurs. This is because of a large number of HPEs occurring in close proximity. As a consequence of handling a large number of HPEs in a short space of time, the overall power consumption increases (e.g. as a consequence of more of the circuitry being in use simultaneously). With HPE throttling, the number of HPEs that are executed per period of time is reduced. Consequently, although the same or a similar amount of energy is consumed, the energy consumed for the HPEs is spread over a longer period. Consequently, the spike illustrated without HPE throttling is spread/smoothed. This results in a lower maximum or peak power consumption.

Figure 6:
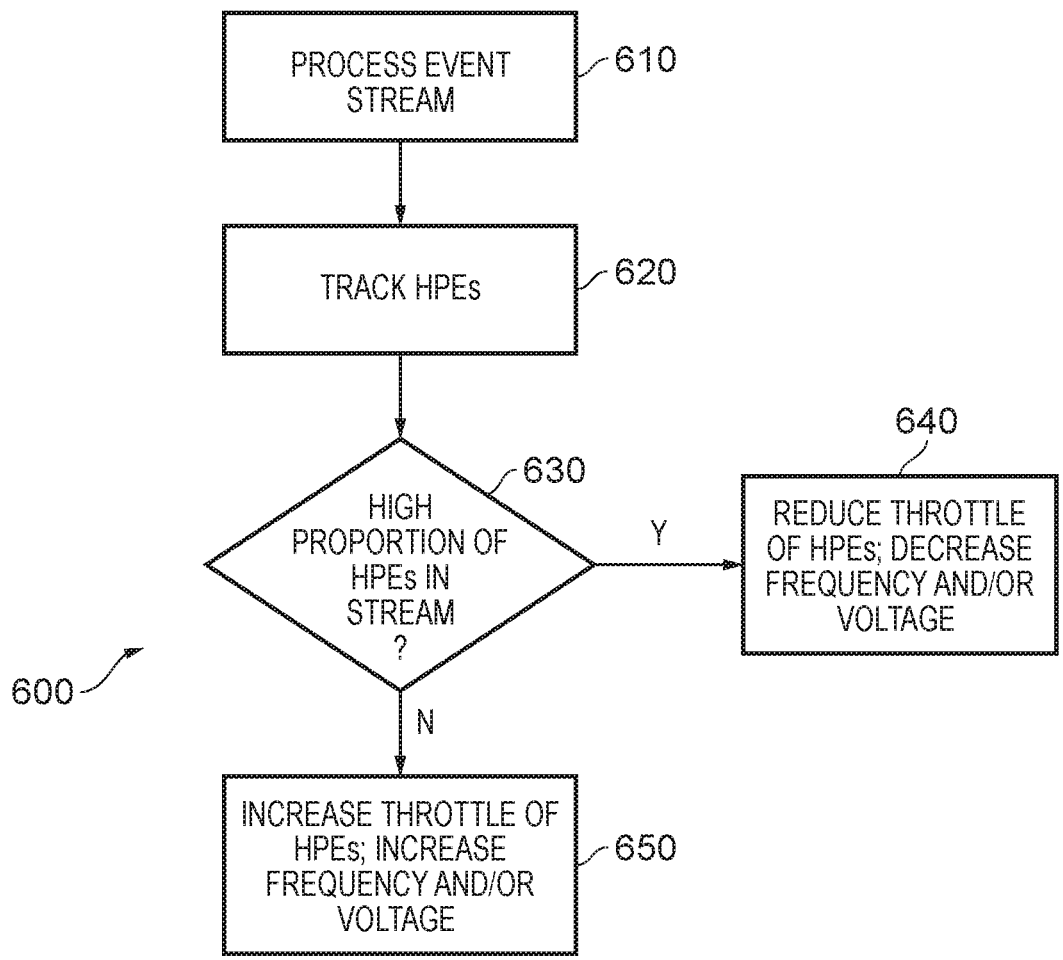
FIG. 6 shows, in the form of a flowchart, how the amount of throttling applied to high power events can be varied in accordance with some embodiments.

FIG. 6 illustrates a data processing method in accordance with some embodiments in the form of a flow chart. At a step 610, the event stream (which could take the form of a plurality of instructions) is processed. At a step 620, the HPEs are tracked. This could take the form of counting the number of HPEs within an interval of time. At a step 630, it is determined whether there is a high proportion of HPEs in the stream. If so then at step 640, the throttling (e.g. the extent to which HPEs is restricted) is reduced. At the same time, voltage and/or frequency may also be reduced to compensate. Otherwise, at step 650, the throttling of the HPEs is increased. At the same time, voltage and/or frequency may be increased to use up the freed up power budget.

Accordingly it can be seen that using the above techniques can make it possible to reduce peak average power consumption of a data processing apparatus. Such a reduction is made having regard to the throughput of the data processing apparatus so that the extent to which throughput is reduced is limited. This is achieved by throttling particular events or instructions that cause unusually high power consumption (HPEs), while other events or instructions are permitted to proceed normally. The energy saved by the throttling of such events or instructions can be used to permit a higher voltage/frequency, which makes it possible for other instructions to execute more quickly.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
   processing circuitry to process an event stream comprising one or more high power events;
   tracking circuitry to track the one or more high power events; and
   power management circuitry to manage power consumption by controlling a voltage supply and a frequency of a clock signal provided to the processing circuitry, wherein
   the power management circuitry is adapted to control an extent to which execution by the processing circuitry of the high power events is restricted;
   the tracking circuitry is adapted to count, for each of a plurality of micro-intervals, a number of the one or more high power events processed by the processing circuitry;
   the tracking circuitry is adapted to count, for a macro-interval comprising the plurality of micro-intervals, a number of the micro-intervals for which the number of the one or more high power events processed by the processing circuitry exceeds an occurrence threshold; and
   the tracking circuitry is adapted to count, for the macro-interval, the number of micro-intervals for which the number of the one or more high power events processed by the processing circuitry exceeds each of a plurality of occurrence thresholds.

2. The data processing apparatus according to claim 1, wherein
   the event stream comprises one or more instructions; and
   the one or more high power events comprise one or more high power instructions.

3. The data processing apparatus according to claim 1, wherein
   the one or more high power events consume more power than an average power consumption of other events in the event stream.

4. The data processing apparatus according to claim 1, wherein
   the one or more high power events comprise a subset of instruction types.

5. The data processing apparatus according to claim 4, wherein
   the subset of instruction types comprises Vector Instructions.

6. The data processing apparatus according to claim 1, wherein
   the power consumption circuitry is adapted to keep power consumption of the data processing apparatus below a power limit by controlling the extent to which execution by the processing circuitry of the high power events is restricted.

7. The data processing apparatus according to claim 1, wherein
   the power consumption circuitry is adapted to smooth peaks in power consumption of the data processing apparatus by controlling the extent to which execution by the processing circuitry of the high power events is restricted.

8. The data processing apparatus according to claim 1, wherein
   the tracking circuitry is adapted to count the one or more high power events.

9. The data processing apparatus according to claim 1, wherein
   the tracking circuitry is adapted to count, for each of a plurality of micro-intervals, a number of the one or more high power events processed by the processing circuitry; and
   the tracking circuitry is adapted to count, for a macro-interval comprising the plurality of micro-intervals, a number of the micro-intervals during which the number of the one or more high power events processed by the processing circuitry exceeds an occurrence threshold.

10. The data processing apparatus according to claim 1, wherein
the power management circuitry defines a plurality of power configurations;
each of the power configurations defines a value for each of the voltage supply, the frequency of the clock signal, and the extent to which execution by the processing circuitry of the high power events is restricted; and
the processing circuitry is adapted to operate in a current power configuration in the plurality of power configurations.

11. The data processing apparatus according to claim 10, wherein
across the plurality of power configurations, as at least one of the voltage supply and the frequency of the clock signal decreases, the extent to which execution by the processing circuitry of the high power events is restricted decreases.

12. The data processing apparatus according to claim 10, wherein
each of the occurrence thresholds is associated with one of the power configurations;
the current power configuration is associated with a current occurrence threshold; and
the power management circuitry is adapted, in response to the current occurrence threshold being exceeded at least an upper limit number of times, to select one of the power configurations in which the extent to which execution by the processing circuitry of the high power events is restricted to a lesser degree than the current power configuration as the current power configuration.

13. The data processing apparatus according to claim 10, wherein
each of the occurrence thresholds is associated with one of the power configurations;
the current power configuration is associated with a current occurrence threshold; and
the power management circuitry is adapted, in response to there being a lower power configuration in which the extent to which execution by the processing circuitry of the high power events is restricted to a higher degree than the current power configurations whose associated threshold is exceeded by at most a lower limit number of times, to select the lower power configuration as the current power configuration.

14. The data processing apparatus according to claim 1, wherein
the power management circuitry causes the high power events to be restricted by throttling the rate at which the high power events are processed by the processing circuitry.

15. The data processing apparatus according to claim 1, wherein
the tracking circuitry is adapted to count, for each of a plurality of micro-intervals, a number of the one or more high power events processed by the processing circuitry; and
the extent to which the high power events are processed by the processing circuitry is a number of high power events executed by the processing circuitry for each of the micro-intervals.

16. A data processing method comprising:
processing, by processing circuitry, an event stream comprising one or more high power events;
tracking the one or more high power events; and
performing power consumption management by controlling a voltage supply and a frequency of a clock signal provided to the processing circuitry, wherein
the power consumption management also comprises controlling an extent to which execution by the processing circuitry of the high power events is restricted;
the tracking counts, for each of a plurality of micro-intervals, a number of the one or more high power events processed by the processing circuitry;
the tracking counts, for a macro-interval comprising the plurality of micro-intervals, a number of the micro-intervals for which the number of the one or more high power events processed by the processing circuitry exceeds an occurrence threshold; and
the tracking counts, for the macro-interval, the number of micro-intervals for which the number of the one or more high power events processed by the processing circuitry exceeds each of a plurality of occurrence thresholds.

17. A data processing apparatus comprising:
means for processing an event stream comprising one or more high power events;
means for tracking the one or more high power events; and
means for managing power consumption by controlling a voltage supply and a frequency of a clock signal provided to the means for processing, wherein
the means for managing power consumption is adapted to control an extent to which execution of the high power events by the means for processing is restricted;
the means for tracking counts, for each of a plurality of micro-intervals, a number of the one or more high power events processed by the processing circuitry;
the means for tracking counts, for a macro-interval comprising the plurality of micro-intervals, a number of the micro-intervals for which the number of the one or more high power events processed by the processing circuitry exceeds an occurrence threshold; and
the means for tracking counts, for the macro-interval, the number of micro-intervals for which the number of the one or more high power events processed by the processing circuitry exceeds each of a plurality of occurrence thresholds.

* * * * *